Patented June 10, 1924.

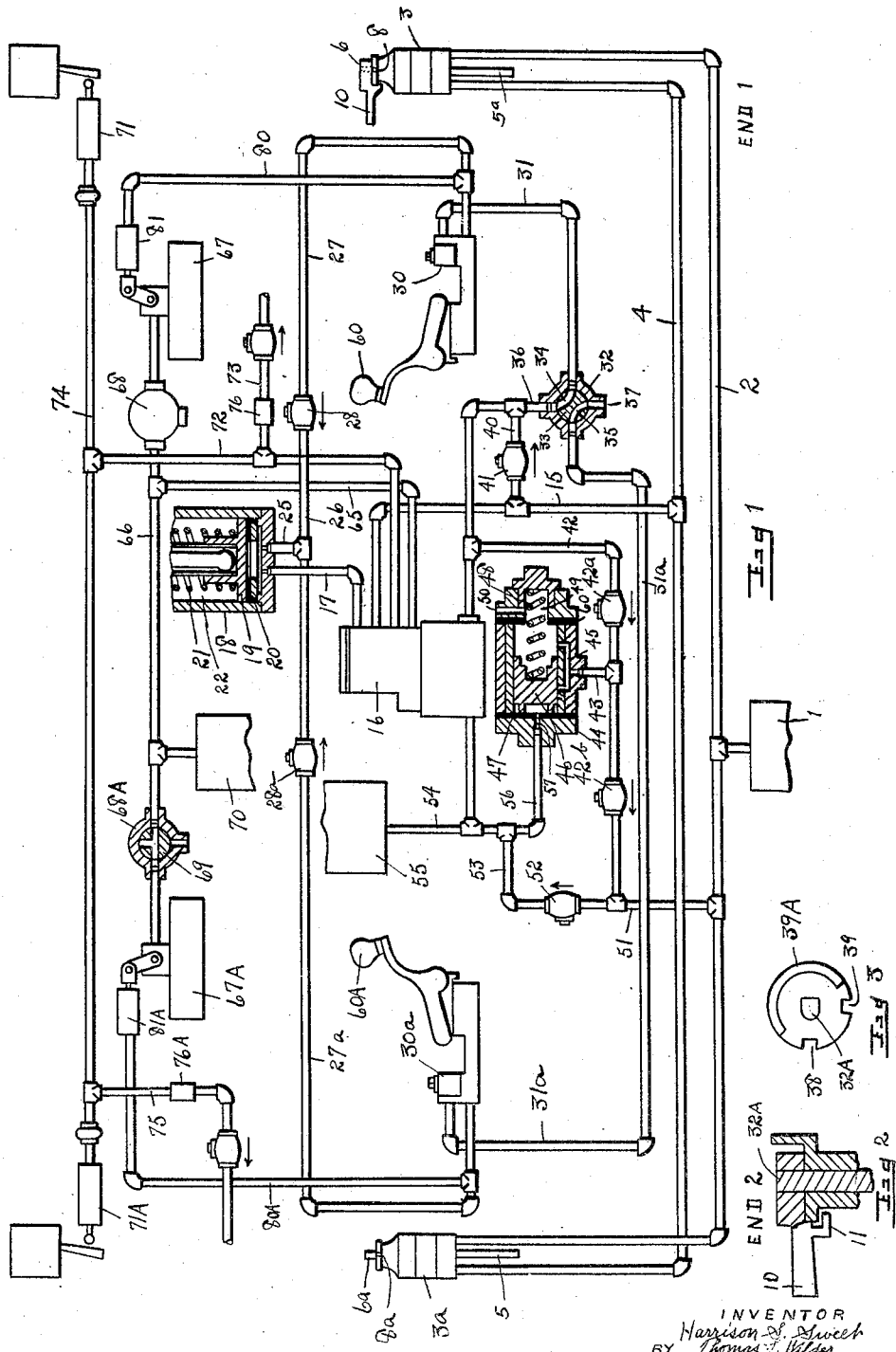

1,497,614

UNITED STATES PATENT OFFICE.

HARRISON S. SWEET, OF UTICA, NEW YORK.

FLUID-PRESSURE SYSTEM FOR ELECTRIC CARS.

Application filed May 15, 1922. Serial No. 560,927.

*To all whom it may concern:*

Be it known that I, HARRISON S. SWEET, a citizen of the United States, residing at Utica, in the county of Oneida and State of New York, have invented certain new and useful Improvements in Fluid-Pressure Systems for Electric Cars, of which the following is a specification, reference being had therein to the accompanying drawing.

My invention relates to a fluid pressure system for electric cars, and I declare the following to be a full, clear, concise and exact description thereof, sufficient to enable anyone skilled in the art to which it appertains to make and use the same reference being had to the accompanying drawings in which like reference characters refer to like parts throughout the specification.

The object of the invention is to provide a system that will have certain improvements over a former application filed by me in the United States Patent Office, January 13, 1922, and numbered serially 528,894, more particularly with respect to the method of changing operating ends in a double end car, as well as in the method of applying the brakes when the compressed air falls below a predetermined degree and also in the means for equalizing the pressure between the main and emergency reservoirs that contain compressed air used in the system. Moreover, the mechanism for equalizing the pressure is employed also to operate the brakes when said pressure falls below a predetermined degree and in this respect simplifies the system described in said former application.

The invention is provided also with novel means for exhausting the compressed air from the pilot valves into the brake cylinder instead of the straight air pipe, as was the case in said former application. Thus, providing improved means for applying the brakes upon releasing the pilot valve handles. This feature being particularly useful in the event of a frozen straight air pipe between brake valve and emergency valve, for under these circumstances no brake application could be effected from brake valve handle nor by releasing the pilot valve handles unless the brake valve handle should be in release position which would destroy the emergency feature of the system.

The object will be understood by referring to the drawings; in which:

Fig. 1 is a diagrammatic view of the system, showing parts in full lines and other parts in section;

Fig. 2 is an enlarged detail view showing a central vertical section of a valve stem and immediate parts used, certain thereof being broken away;

Fig. 3 is an enlarged detail view, showing a plan view of the valve stem and immediate parts used and illustrated in detail in Fig. 2, the handle being removed therefrom.

Referring more particularly to the drawings, the system embodies a main reservoir tank 1 adapted for the storage of a fluid, preferably compressed air. A main supply pipe 2 connects the tank 1 with the brake valve casings 3 and 3ª, which are shown and described in the above referred to application. A pipe 4 connects also brake valve casings 3 and 3ª. Pipes 5 and 5ª are connected to casings 3 and 3ª respectively and exhaust to atmosphere.

The rotary valves within casings 3 and 3ª are in each instance equipped with upstanding stems 6 and 6ª that are squared or angled in cross section, whereby to receive the corresponding aperture formed in handle 10. Handle 10 has a lug 11, whereby to permit the said handle 10 to be placed on and taken off stems 6 or 6ª when opposite slot 8 and 8ª only, in which position all ports of the respective valves within said casings 3 and 3ª are closed.

Pipe 4 is connected by pipe 15 to emergency valve casing 16, that is described in the former application. Casing 16 is in turn connected by pipe 17 to brake cylinder casing 18 of well known construction, which enclosed a piston 19 held normally against seat 20 by a coiled spring 21. Piston 19 is forced off from seat 20, whereby to allow for an application of the brakes by a direct passage of compressed air from tank 1, pipe 2, brake valve casing 3, if end one is operative, and the brake valve is turned to application position, pipe 4, pipe 15, through the port in the emergency valve located in casing 16, as described in the former application, pipe 17 and chamber 22 of the brake cylinder casing 18.

Chamber 22 is connected by pipe 25 to pipe 26, which is in turn connected to pipes 27 and 27ª respectively by one way valves 28 and 28ª. Pipes 27 and 27ª are connected to the pilot valve casings 30 and 30ª respectively that are described also in said former application. This connection of the chamber 22 of the brake valve cylinder to the pilot valve casings 30 and 30ª, differentiates this application from the former where the brake valve cylinder was connected to the straight air pipe, in one respect. Pipes 31 and 31ª connect the chamber in said casings 30 and 30ª to the chamber in casing 32 that has a rotary valve 33 with two ports 34 and 35. Port 34 is adapted to connect pipes 31 and 36 and port 35 connects pipe 31ª to atmosphere through outlet 37 made in casing 32, whereby the system is equipped to effect an emergency application of the brakes at one end of the car and to render inoperative the emergency system at the opposite end of the car.

Valve 33 is equipped with an upstanding stem 32ᴬ that is squared or angled in cross section for the assembling of handle 10 that fits also stem 6 and 6ª of the brake valves. The top of the casing has notches 38 and 39 and a guard 39ᴬ, whereby handle 10 can be placed on or removed from valve stem 32ᴬ only in these two positions, in one of which valve 33 will connect pipes 31 and 36 and 31ª to outlet 37 and in the other of which pipe 36 will connect to pipe 31ª and pipe 31 to outlet 37.

Pipe 36 is connected to pipe 15 by a cross pipe 40 having a one way valve 41, as indicated by the arrow, disposed therein. It also connects to the lower chamber of emergency valve casing 16 as fully described in the former application. Moreover, pipe 36 is connected to pipe 42 that is equipped with two one way valves 42ª and 42ᵇ adapted to allow for the passage of compressed air in the direction indicated by the arrows.

Pipe 42 is connected to pipe 43 that is in turn joined to the switching and equalizing valve casing 44 at the location of the two way port 45. Casing 44 contains a piston valve 46 held normally against seat 47 by a coiled spring 48, whereby compressed air entering chamber 49 from pipe 43 will exhaust to atmosphere by way of outlet port 50, whereby it will be impossible to charge the emergency pipe 36 while switching valve 46 is against seat 47.

Pipe 42 is connected also to pipe 51 which has a one way valve 52 indicated by the arrow. Pipe 51 is connected to main supply pipe 2 at one end and to pipe 53 at the other. Pipe 53 is joined to pipe 54 and pipe 54 to emergency reservoir tank 55 that is adapted to supply compressed air in the event that the main reservoir 1 should be destroyed by some unforeseen contingency, as in case of a collision. Pipe 54 is joined to pipe 56 which is connected to a port 57 of the switching valve casing 44, whereby, as compressed air is built up in main reservoir 1 it will be free to flow to the emergency tank 55 and to chamber 49 of switching valve casing 44 and when it reaches a predetermined degree, the compressed air will overcome the tension of spring 48 and force piston valve 46 against seat 60 thus connecting pipe 43 to chamber 49 by way of two way port 45 and, thereby, close the vent to atmosphere through outlet port 50. This will open up a passageway between emergency tank 55 and main tank 1 by way of pipes 54, 56, chamber 49 in switching valve casing 44, port 45, pipe 43, pipe 42, pipe 51, pipe 53, and pipe 2, whereby to equalize the pressure between reservoir tank 1 and 55. Furthermore, inasmuch, as pipe 43 will under these circumstances carry reservoir pressure, the emergency pipe 36 may be charged now by moving brake valve handle 10 to application position, whereby to admit compressed air to the under side of the emergency valve, as stated in the former application. The brakes can be released, thereafter by holding down pilot valve handle 60 or 60ᴬ in accordance with which end the car is being operated from and moving brake valve handle 10 to release position.

In the event that the compressed air in reservoirs 1 and 55 and their system falls below a predetermined degree, spring 48 will force piston valve 46 from seat 60 against seat 47, whereby to shut off the further passage of air from emergency tank 55 to main reservoir tank 1 and, thereby, retain the compressed air in the emergency tank 55 for effecting an emergency application of the brakes which will occur immediately.

The system for operating the doors of the car, not here shown, embodies a pipe 65 connected to the emergency valve casing 16 at one end and pipe 66 at the other which leads to the engines 67 and 67ᴬ for operating the doors. These engines and system are fully described in the former application with the exception of the three way cocks 68 and 68ᴬ. Cocks 68 and 68ᴬ each have a rotary valve 69 that is equipped with a three way port. The port of valve 69, as shown at 68ᴬ in Fig. 1 continues the passageway through pipe 66. When turned at an angle of ninety degrees thereto, however, it will close pipe 66 and, thereby, shut off the compressed air from said engine 67 or 67ᴬ to allow the doors to become balanced, which is desirable, when the car is in shop for repairs.

An auxiliary tank 70 is connected to pipe 66 and is adapted to be supplied with compressed air from the chamber in emergency valve casing 16 by way of pipe 65. The compressed air in auxiliary tank 70 will be discharged when an emergency application of the brakes is made, whereby to balance the doors on their hinges after a short interval of time sufficient to bring the car to a stop, and to actuate the electric circuit knock off switch cylinders 71 and 71ᴬ, and the sanders not here shown, as described in the former application. The passageway from the auxiliary tank 70 to electric knock off switch cylinders 71 and 71^A and sanders is by way of pipe 66, pipe 65, the port in emergency valve casing 16, pipe 72, pipe 73 to sander at one end of the car, pipe 74 to switch cylinders 71 and 71^A and pipe 75 to sander at the opposite end of the car. Bushings 76, 76^A are employed to reduce the pressure reaching the sanders, not shown.

The air pressure for opening the doors, not shown, has passageway through pivot valve casings 30 and 30^A to pipes 80 and 80^A to operating cylinders 81 and 81^A of the door engines 67 and 67^A.

Whenever the operator desires to change the operating end of the car, a straight air application of the brakes is effected by brake valve handle 10 applied to valve stem 6, if changing from end one to end two. Handle 60 of pilot valve 30 is released now and flies upward, which action allows the pressure to flow through pipe 31, pilot valve casing 30, pipe 80, door operating cylinder 81, thus opening the door at end one of the car. The operator will remove now handle 10 from brake valve stem 6 with the brakes applied and the brake valve in lap or closed position, as that is the only position in which it is possible to remove handle 10. The operator will place now handle 10 on stem 32^a of valve 33 and turn the handle 10 ninety degrees to notch 39 and remove the handle. This action will connect pipe 36 and pipe 31^a and exhaust pipe 31 to atmosphere. It also exhausts fluid pressure from pipe 80 by way of pilot valve 30, pipe 31, port 35 and outlet 37, thereby, releasing the pressure in cylinder 81 which action will close the door at end one.

Pipe 36 now being ported to pipe 31^a air pressure will flow through pipe 36, pipe 31^a, pilot valve 30^A, assuming that handle 60^A is in up position, to pipe 80^A to cylinder 81^A which controls the door engine 67^A and opens the door at end two. The operator now places handle 10 on brake valve stem 6^A and by pressing down on handle 60^A will vent the air pressure from pipe 80^A to close the door at end two. The brakes can be released now by moving handle 10 on stem 6^A and turning its valve to release position.

If pipe 36 has been charged from pipe 2 through brake valve in casing 3 and check valve 41, and handle 60 is held down, the brakes can be released by moving the brake handle 10 to release position. If handle 60 is now released, compressed air will be able to flow through pipe 36, pipe 31, pilot valve casing 30, pipe 27, check valve 28, pipe 26 to brake cylinder 18. The capacity of these pipes and brake cylinder will allow for a reduction in air pressure sufficient to trip the emergency valve and effect an emergency application of the brakes. Should brake valve handle 10 be left in lap position with all ports closed, there being no pressure in pipes 4, 17, brake cylinder 18 and pipe 26, the same result will be obtained, as there will be such a reduction in pressure in pipe 36 as to trip the emergency valve in casing 16.

If a straight air application of predetermined pressure is made, whereby to fill pipes 4, 15, 17, and 26 and brake cylinder 18, and handle 60 be released, it will open the valve in casing 30. However, sufficient pressure will not flow through one way valve 28 to trip the emergency valve in casing 16, so that an emergency application of the brakes will not be effected. Should handle 10 of the brake valve in casing 3 be moved to release position before handle 60 is pressed down, the air pressure in emergency pipe 36 will flow through the valve in casing 30 to pipe 27, check valve 28, pipe 26, brake cylinder 18, pipe 17, pipe 15, pipe 4, brake valve casing 3, pipe 5 to atmosphere to effect an emergency application of the brakes.

Having thus described my invention what I claim as new and desire to secure by Letters Patent is:

1. In a fluid pressure system for electric cars, automatic means for applying the brakes, a manually operated valve located in said system, whereby to operate said automatic means from either end of the car independent of the other.

2. In a fluid pressure system for electric cars, automatic means for applying the brakes, a manually operated valve having two ports located in said system, whereby to operate said automatic means from either end of the car independent of the other end.

3. In a fluid pressure system for electric cars, automatic means for applying the brakes, a manually operated valve, two ports in said valve, whereby to effect an operation of the automatic means from either end of the car independent of the other end.

4. In a fluid pressure system for electric cars, an emergency valve device adapted to operate upon a reduction in pressure, whereby to effect an application of the brakes, means located in the system for venting the pressure from the emergency valve device, whereby to control the operation of the emergency valve device from either end of the car independent of the other 5. In a fluid pressure system for electric cars, an emergency valve device adapted to operate upon a reduction in pressure to set the brakes, and a four way valve for controlling the operation of the emergency valve device from either end of the car independent of the other.

6. In a fluid pressure system for electric cars, an emergency valve device adapted to effect an emergency application of the brakes, automatic means for operating said emergency valve device, and a valve for controlling said emergency valve from either end of the car independent of the other.

7. In a fluid pressure system for electric cars, an emergency valve, whereby to effect an emergency application of the brakes, a valve for controlling the operation of said emergency valve from either end of the car independent of the other and means located on said controlling valve, whereby to insure the working of the emergency valve from either end of the car independent of the other.

8. In a fluid pressure system for electric cars, a pressure system, an emergency valve adapted to be operated by said pressure, whereby to make an application of the brakes automatically, and a switching valve located in said system, whereby to effect an emergency application of the brakes, when the pressure falls below a predetermined degree.

9. In a fluid pressure system for electric cars, a main reservoir and an emergency reservoir for maintaining a pressure in said system, an emergency valve adapted to be operated by a reduction in the pressure of said system, and a switching valve connected directly to said reservoirs, whereby to effect an automatic operation of the emergency valve to set the brakes, when the pressure falls below a predetermined degree.

10. In a fluid pressure system for electric cars, a main reservoir and an emergency reservoir for maintaining a pressure in said system, an emergency valve connected in said system, whereby to effect an automatic operation of the brakes upon a reduction in pressure in said system, and a valve located in said system, whereby to control the operation of the emergency valve from either end of the car independent of the other.

11. In a fluid pressure system for electric cars, a main reservoir and an emergency reservoir, a valve located in said system, whereby to equalize the pressure between said reservoirs, an emergency valve for effecting an automatic application of the brakes, when the pressure in said system falls below a predetermined degree, and means located in said system for controlling the operation thereof from either end of the car independent of the other.

12. In a fluid pressure system for electric cars, a main reservoir and an emergency reservoir, a valve located in said system, whereby to equalize the pressure between said reservoirs, an emergency valve for effecting an automatic application of the brakes, when the pressure in said system falls below a predetermined degree, a manually operated valve for controlling the operation of the system from either end of the car independent of the other, and means located on said last named valve for assuring the operation of the system from either end of the car.

13. In a fluid pressure system for electric cars, a reservoir system for maintaining a pressure, a valve located in said system for equalizing said pressure, an emergency valve for effecting an automatic operation of the brakes, doors, electric switches and sander of said car, and a third valve for controlling said system from either end of the car independent of the other.

14. In a fluid pressure system for electric cars, a pressure system, a valve located in said system for equalizing the pressure therein, a second valve for effecting an automatic operation of the brakes, doors, electric switches and sanders of the car, a third valve for controlling said system from either end of the car independent of the other, and means located on said last named valve, whereby to assure the proper functioning of the several parts of the system.

15. In a fluid pressure system for electric cars, automatic means for applying the brakes, a manually operated valve located in said system for making ineffective the automatic means on one end of the car, and for making effective the automatic means on the opposite end of the car.

16. In a fluid pressure system for electric cars, an emergency valve device connected to an emergency pipe and adapted to operate upon a reduction in pressure, whereby to effect an application of the brakes, a manually operated device located in said system for venting fluid from said emergency pipe, whereby to make effective the automatic means on one end of the car and ineffective on the other end.

17. In a fluid pressure system for electric cars, an emergency valve device connected to an emergency pipe and adapted to operate upon a reduction in emergency pipe pressure, whereby to effect an application of the brakes, a manually operated device for venting fluid from said emergency pipe, and means operated by a second valve device for making ineffective this manually operated device on one end of the car and making effective a similar manually operated device on the other end of the car.

18. In a fluid pressure system for electric cars, an emergency valve device connected to an emergency pipe and adapted to operate upon a reduction in pressure, whereby to effect an application of the brakes, a manually operated device for venting fluid under pressure from said emergency pipe and a second valve device for controlling the effect of the manually operated device independently from either end of the car, and means for assuring fluid under pressure is vented from the first named manually operated device, when the second is operated.

19. In a fluid pressure system for electric cars having brakes, an emergency valve device connected to an emergency pipe and adapted to operate upon a reduction in emergency pipe pressure, whereby to effect an application of the brakes, a manually operated device for venting said pressure from the emergency pipe, a second manually operated device for making effective the first named manually operated device on one end of the car and making ineffective a similar manually operated device on the other end, and means for assuring the pressure is vented from the first named manually operated device when the second is operated.

20. In a fluid pressure system for electric cars having brakes, a valve connected to a pipe and adapted to operate upon a reduction in pressure in said pipe, whereby to effect an application of the brakes, a manually operated device for venting pressure from said pipe, a second manually operated device for making effective the first named manually operated device on one end of the car and rendering it ineffective on the other end, and means for assuring that the second named manually operated device shall be operated to effect the above result.

21. In a fluid pressure system for electric cars having brakes, a power controller handle, a brake cylinder in said system, a valve adapted to operate upon a reduction in pressure, whereby to make an application of the brakes, and a pilot valve adapted upon release of the power controller handle to vent the pressure to said brake cylinder, whereby to make an application of the brakes.

22. In a fluid pressure system for electric cars having brakes, a brake cylinder, an emergency valve device adapted to operate upon a reduction in pressure, whereby to make an application of the brakes, means for venting the pressure into said brake cylinder, and a check valve for preventing the back flow of the pressure from the brake cylinder.

23. In a fluid pressure system for electric cars, an emergency pipe, an emergency valve connected to said pipe, whereby a reduction in pressure in said pipe will effect an application of the brakes, an emergency reservoir for supplying pressure to said emergency valve, a main reservoir connected to said emergency reservoir, a valve for equalizing the pressure in said main reservoir with the pressure in the main reservoir, and automatic means for venting the pressure from the emergency pipe when the pressure in said main reservoir falls below a predetermined degree.

24. In a fluid pressure system for electric cars, an emergency pipe, an emergency valve connected to said pipe, whereby a reduction in pressure in said pipe will effect an application of the brakes, an emergency reservoir adapted for supplying pressure to said emergency valve, a main reservoir connected to said emergency reservoir, a valve for equalizing the pressure between said reservoirs, and a piston valve for stopping this equalizing and for venting the pressure from the emergency pipe when pressure in main reservoir falls below a predetermined degree.

In testimony whereof I have affixed my signature.

HARRISON S. SWEET.